United States Patent Office 3,125,811
Patented Mar. 24, 1964

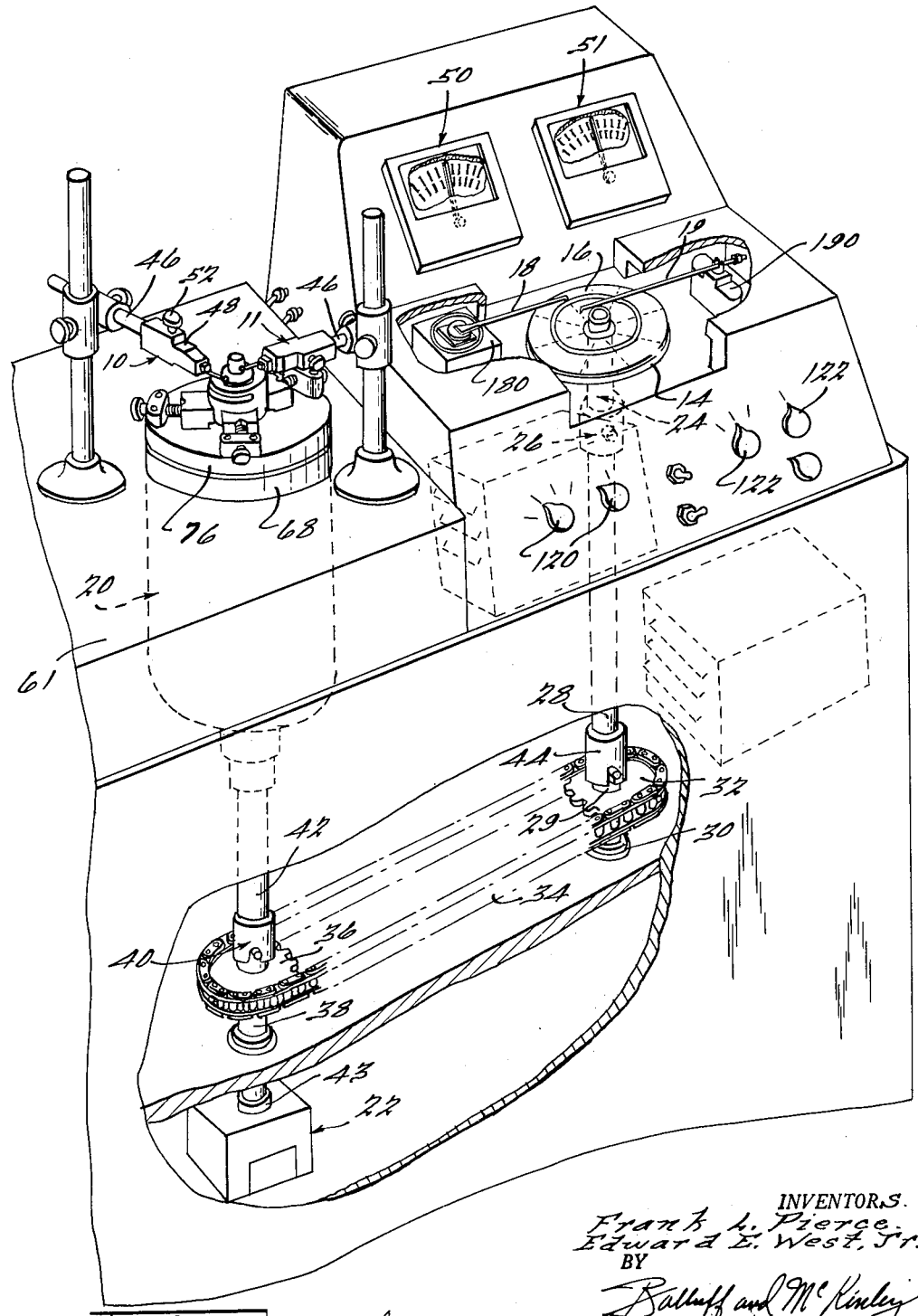

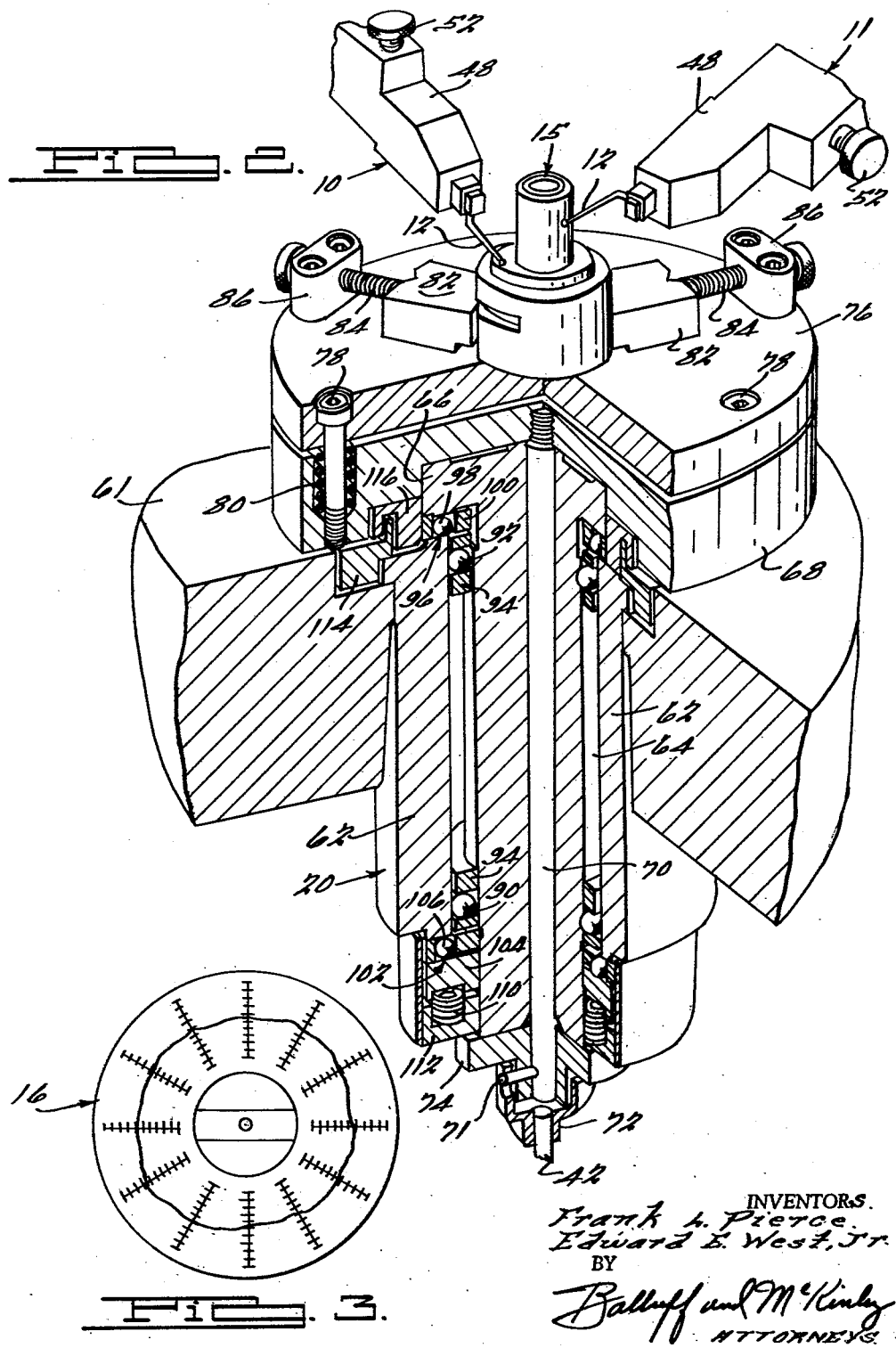

3,125,811
MACHINE FOR MEASURING ROUNDNESS, CONCENTRICITY, AND SQUARENESS
Frank L. Pierce, Boston, and Edward E. West, Jr., Dorchester, Mass. (both of 3105 SW. 2nd Ave., Fort Lauderdale, Fla.)
Filed Apr. 13, 1959, Ser. No. 806,070
6 Claims. (Cl. 33—174)

This invention relates to a machine or instrument designed for precision measurement of the roundness and concentricity of cylindrical surfaces on a part, the flatness of annular surfaces on such a part, as well as their squareness in relation to each other.

Roundness measuring instruments now available, such as shown in Canadian Patent No. 569,145, issued January 20, 1959, have a limited utility in that the construction does not permit the use of more than one indicator at a time on the part being measured, the precision measurement of the flatness of annular surfaces, or the squareness of an annular surface in relation to a cylindrical surface on the same part.

A machine embodying our invention has many significant advantages over such prior art machines in that with our machine it is possible to use a plurality of indicators simultaneously on the same part. In addition, our machine will measure the squareness of cylindrical surfaces with relation to an annular surface of the same part and vice versa, and will show the out-of-squareness of the surfaces being measured, as well as any out-of-flatness of the annular surfaces and any out-of-roundness of the cylindrical surfaces.

A principal object of the invention therefore is to provide a novel, simple, and efficient machine for making precision measurements of the type indicated.

Another object of the invention is to provide a precision spindle of rugged construction which carries the part to be measured.

Other and further objects of the invention will be apparent from the following description and claims and may be understood by reference to the accompanying drawings, of which there are two sheets, which by way of illustration show a preferred embodiment of the invention and the best mode of applying the principles thereof. Other embodiments of the invention may be used without departing from the scope of the present invention as set forth in the appended claims.

In the drawings:

FIG. 1 is a perspective view of a machine embodying the invention;

FIG. 2 is an enlarged perspective view of the spindle unit which is shown in section; and FIG. 3 is a plan view of a recording chart on which a graph of the measured surface is traced.

A machine embodying the invention comprises in general a plurality of electronic displacement indicators 10 and 11, each provided with a contact tip 12, a polar coordinate chart recorder including a rotary disc 14 adapted to have a recording chart 16 removably positioned thereon and provided with recorder pens 18 and 19 responsive to the amplified signals from indicators 10 and 11, respectively, generated by the scanning of surfaces on a part 15 and adapted to trace graphs of such surfaces on the recording chart 16.

The machine further includes a precision rotary spindle unit indicated generally at 20 and an electric motor 22 operable for rotating the measuring spindle or shaft of the unit 20 at a set speed of 4 r.p.m. or any speed suitable for precision measuring. The disc 14 is fixed on a rotary shaft 24, journaled for accurate rotation in suitable high precision anti-friction bearings, which is coupled by a universal joint 26 to a drive shaft 28 connected by universal joint 44 to shaft 29 journaled in bearing 30. A sprocket 32 fixed to the shaft 29 for rotation therewith is driven by a chain 34 which in turn is driven by a sprocket 36 fixed to and driven by the motor driven shaft 38. The shaft 38 is coupled by means of a universal joint 40 to the drive shaft 42, the collar 72 fixed thereon being coupled by cross pin 71 to the bolt 70 of the spindle unit 20. The universal joints 26, 40 and 44 isolate the shafts 42 and 24 from stresses and deflections in the drive system and thereby minimize the possibility of error in the accuracy of the machine. Preferably a clutch 43 is operatively arranged between the motor 22 and the shaft 38 to automatically disconnect the motor from the spindle and chart driving mechanism when the motor is at rest to permit manual turning of the measuring spindle during centering operations.

Each of the electronic indicators 10, 11 includes an adjustable crossbar 46 of a stand on which a gage head 48 is adjustably mounted, each gage head carrying a gage or contact tip 12. Tip 12 of indicator 10 as illustrated is positioned to contact the annular surface of part 15 while the tip 12 of indicator 11 is positioned to contact the cylindrical surface of part 15. In use, minute changes in the position of each gage tip normal to the surface being measured are magnified up to ten thousand times or more and may be directly read on the measuring scales of meters 50 and 51 to which the gage heads 48 are respectively connected. The gage head 48 of indicator 10, meter 50, and electronic amplifier therefor (not shown) are included in a suitable circuit which picks up minute changes in the gage tip position as the part 15 rotates, electronically magnifies such changes up to ten thousand times or more, and then deflects the indicating needle of meter 50 so that the deviation of the measured annular surface of part 15 from the master dimension may be read directly on the scale of meter 50. The gage head 10 of indicator 11, meter 51, and electronic amplifier therefor (not shown) are similarly included in a suitable circuit.

Each contact tip 12 is supported on the head 48 so as to provide frictionless movement without backlash or wear, thus insuring repeatable measurements. A fine adjustment on each head controlled by knob 52 facilitates accurate positioning of the contact tip 12 in proper contact with the surface on the part to be measured. The meters 50 and 51 will directly indicate the amount that the surfaces being measured deviate from the standard. We have found that the Cleveland INDI–AC Electronic Indicator Model 1A–515, manufactured and sold by Cleveland Instrument Company, Inc., of Cleveland, Ohio, is a commercially suitable form of indicator. The meters 50 and 51 may be standard PAR–AC amplifier three scale meters made and sold by the Cleveland Instrument Company, and having a total measurement range from .000010 inch to .010 inch ±, and scales marked in .000010 of an inch.

The spindle unit 20 is provided with an adjustable chuck adapted to hold the part 15 to be measured. The chuck holds such part 15 and is adapted to permit adjustment of the cylindrical surface of the part to be measured so that the axis of such part to be measured can be aligned with the axis of rotation of the spindle.

The spindle unit 20 is supported on and projects above a horizontal surface plate 61 of the machine and includes a tubular housing 62 carried by the plate 61, and a tubular shaft or spindle 64 provided with an integral circular head 66 at one end. A disc 68 is accurately fitted on the head 66 and secured thereon by bolt 70 which extends through the hollow spindle 64, the upper end of bolt 70 being threadedly secured to the disc 68. A head or turntable 76 is disposed and spaced above the disc 68 and adjustably secured thereto by means of three "Allen" head bolts 78, the heads of which are accommodated in pockets in the head 76, while the threaded ends of the bolts 78 are threaded into tapped holes in the head 68. A coil spring 80 surrounding each bolt 78 reacts against the disc 68 and the head 76 for resiliently supporting the head 76 of the spindle on the disc 68 which in turn is carried by the head 66 of the shaft 64. By adjustment of one or more of the bolts 78, the head 76 may be adjusted or tilted so as to permit the part 15 to rotate about its own axis, or so that the cylindrical surface thereof to be measured will be concentric with the axis of the spindle, and/or so that the annular surfaces thereof to be measured will be perpendicular to the axis of rotation of spindle 64.

The head is provided with a series of adjustable work holding jaws 82 swivelled on the ends of screws 84 which are threaded through threaded openings in the blocks 86, which in turn are secured to the head 76. This arrangement permits centering of the object being measured, so that its axis is on the axis of the spindle. The collar 72 is coupled with the shaft 42 so that the spindle shaft 64 will rotate at the set speed at which the motor operates.

The outer cylindrical surface of the spindle shaft 64 and the inner cylindrical surface of the tubular housing 62 form concentric cylindrical raceways or bearing surfaces for two or more series of bearing balls 90 and 92, each series comprising a plurality of uniformly spaced uniform high precision balls maintained in position by a spacing sleeve 94 provided with a pocket in which each ball of the series is freely located. The balls 90 and 92 and the cooperating cylindrical surfaces of parts 62 and 64 accurately position the spindle 64 for accurate rotation about its axis.

Another ballbearing indicated generally at 96 includes a series of bearing balls 98 operatively disposed between an upper flat annular bearing surface of the tubular housing 62 and the opposed flat annular bearing surface of the circular head 66, whereby the head 66 will accurately rotate in a plane normal to the axis of the spindle 64. The bearing balls 98 are maintained properly spaced and in operative position by spacer ring 100. Another ballbearing, indicated generally at 102, includes a series of bearing balls 106 operatively disposed between a flat annular bearing surface of the under side of the tubular housing 62 and the upper flat annular bearing surface of a circular block 104, the opposed surfaces of the member 62 and the block 104 forming uniformly spaced circular bearing races for the bearing balls 106 of bearing 102.

The block 104 is biased upwardly by a series of coil springs 110 which are seated in a disc 112 which in turn is seated on the upper surface of the collar 74 positioned on bolt 70 by cross pin 71. Sealing ring 113 encloses 102, 104 and 112. The sealing rings 114 and 116 carried by the tubular housing 62 and the circular head 66 on the spindle 64 provide a rotary seal for the upper end of the spindle unit. The space adjacent the bearings and within the spindle unit 20 is provided with lubricant for the bearings. As the accuracy of the measurements made depend on the accuracy of the instrument, it is of the utmost importance that the parts of the spindle unit be accurately made and fitted so that the shaft 64 will accurately rotate. By precision spindle we mean one in which the uncertainty of rotation is extremely small. We have built spindle units of the construction shown in which the uncertainty of rotation of shaft 64 is less than .00003 inch in both radial and axial directions.

The tips 12 of the electronic indicators are used to measure the variations in or out of roundness of round surfaces, or flatness of annular surfaces, as well as their squareness in relation to each other. The tip of each of the electronic indicator heads 48 is operatively connected to an amplifier (not shown) and the deviations from the standard due to minute changes in the gage tip position as the surface being measured moves relative to the gage tip 12 are displayed on the meter 50 or 51, as the case may be. Various amplifications for each meter (up to 20,000 to 1) are provided by means of a switch, the knob of which is indicated at 120. By means of the switch 122 the output of each amplifier can be switched from the meter 50 or 51 to the respective recording element 180 or 190, so that the recording pen 18 or 19 thereof will record on the paper chart 16, as illustrated in FIG. 3, separate graphs of the measured surfaces. The chart disc 14 and the chart 16 thereon are driven in unison with the spindle 64 by means of the drive chain 34 and sprockets 32 and 36. The recording elements may be of the permanent magnet, moving coil measuring element type manufacturing and sold by The Esterline-Angus Co. Inc. of Indianapolis, Indiana.

Each electronic indicator and amplifier therefor may be used simultaneously with or independent of the other indicator, and the measuring signals from the indicators may be simultaneously or independently recorded by the pens 18 and 19 on the chart 16. Thus one of the indicators may be used to measure out-of-roundness of a cylindrical surface on part 15 while the other may at the same time be used to measure out-of-flatness of an annular surface on such part.

The graph traced on the chart shown in FIG. 3 shows the amount by which the surface of the part being measured departs from a standard. We have found that charts made by Technical Charts, Inc., of Buffalo, New York, such as their chart TCI 9146, are quite satisfactory for use on the disc 14 for recording the graphs made by the recording pens 18 and 19.

In practice, recordings on circular charts are used for measurements, rather than observing numbers on the meter; the meter is used to center the object being measured, or to adjust surfaces square to axis of rotation of the spindle. The reading on the meter of a substantially radial direction will show the out-of-roundness of the object plus any errors of centering that may have been made, but comparison of the trace on the circular chart to a circle will show the out-of-roundness only. In a similar fashion, a measurement in an axial direction will be indicated on the meter as out of squareness plus out of flatness, but on the trace on a circular chart will show squareness as the concentricity of the trace to the center of the chart and the flatness as roundness of the trace as compared to a circle.

The machine is arranged so that squareness, roundness, and concentricity measurements may be recorded on one chart from one or more indicators.

While we have illustrated and described a preferred embodiment of our invention, it is understood that this is capable of modification, and we therefore do not wish to be limited to the precise details set forth but desire to avail ourselves of such changes and alterations as fall within the purview of the following claims.

We claim:

1. In a machine for measuring the variations in roundness and concentricity of cylindrical or conical surfaces of a part as well as their squareness in relation to an annular surface on said part, a first electronic displacement indicator provided with a contact tip adapted to contact the moving cylindrical surface of a part to be measured, a polar coordinate chart recorder including a rotary chart disc adapted to have a recording chart positioned thereon and a recorder pen responsive to the signal from the indicator generated by the contact of such tip with such moving surface and adapted to trace a graph of such cylindrical surface on said recording chart, a rotary high precision spindle, radial and axial thrust anti-friction precision bearings supporting said spindle for rotation about a fixed vertical axis while preventing axial movement of said spindle, means for rotating said spindle about its axis, said chart disc being synchronized with the rotation of said spindle, a chuck carried by the spindle and arranged to hold and support the part to be measured for rotation therewith in fixed relation to said spindle, adjustable means supporting said chuck in fixed relation on said spindle for rotation therewith whereby said chuck can be adjusted so that an annular surface on the part to be measured and held by the chuck will be perpendicular to the spindle axis, a second indicator provided with a contact tip adapted to contact such annular surface on such part as said spindle rotates, a second polar coordinate chart recorder having a recorder pen responsive to the signal from said second indicator generated by the contact of the tip of said second indicator with said annular surface and adapted to trace a graph of said annular surface on said recording chart simultaneously with the recording of the graph of the cylindrical surface of the part, said machine being characterized in that said indicators and the contact tips thereof are free of the load of the part to be measured and in that said part is supported by said chuck so as to be rotated by said spindle and at the same speed thereof.

2. In a machine for measuring micro variations in roundness and concentricity of cylindrical or conical surfaces of a part, the combination of an electronic displacement indicator provided with a contact tip adapted to contact the slowly rotating surface of a part to be measured, a polar coordinate chart recorder including a rotary chart disc adapted to have a recording chart positioned thereon and a recorder pen responsive to the signal from the indicator generated by the contact of such tip with such moving surface and adapted to trace a greatly enlarged profile of such surface on said recording chart, a rotary high precision spindle, precision bearings symmetrically supporting said spindle for rotation about a fixed axis while eliminating end play and wobble of said spindle, means for rotating said spindle about its axis, said disc being synchronized to rotate at the same speed as said spindle so that said profile may be directly related to said measured surface, an adjustable chuck adapted to be angularly adjusted relative to said spindle axis to hold and support the part to be measured for rotation therewith in fixed relation to said spindle with the axis of said surface oriented parallel to and in fixed relation with said spindle axis, and means supporting said chuck in fixed relation on said spindle for rotation therewith, said machine being characterized in that said indicator and the contact tip thereof are free of the load of the part to be measured, in that said part is supported by said chuck so as to be rotated by said spindle and at the same speed thereof, and in that said means rotate said spindle at a continuous slow speed at which said contact tip while in contact with the rotating surface of said part carried by said spindle will accurately sense micro-variations in the surface of such part.

3. A measuring machine according to claim 2 wherein said spindle rotating means include a motor connected to said spindle for rotating the latter while permitting manual rotation of said spindle when said motor is deenergized, and a driving connection between said spindle and disc for rotating the same at the same speed as the spindle.

4. In a machine for measuring micro-variations in roundness and concentricity of cylindrical or conical surfaces of a part, a stationary electronic displacement indicator provided with a contact tip adapted to contact the slowly rotating surface of a part to be measured, a rotary high precision spindle, precision bearings supporting said spindle for rotation about a fixed vertical axis while preventing axial movement of said spindle, means for rotating said spindle about its axis, a chuck arranged to hold and support the part to be measured for rotation therewith in fixed relation to said spindle, with the axis of said surface oriented parallel to and in fixed relation with said spindle axis, adjustable means supporting said chuck in fixed relation on said spindle for rotation therewith whereby said part rotates with the spindle and at the same speed thereof and can be adjusted in a plane perpendicular to the spindle axis and can be tilted relative to the spindle axis, and means to indicate the deflection of said contact tip as said surface to be measured rotates relative to said contact tip, said machine being characterized in that said indicator and the contact tip thereof are free of the load of the part to be measured, and in that said means rotates said spindle at a slow speed at which said contact tip while in contact with the rotating surface of said part carried by said spindle will accurately sense micro-variations in the surface of such part.

5. A machine according to claim 4 having a surface plate with an opening therein and a tubular housing disposed in said opening and supported by said plate and wherein said spindle is disposed within said housing, the exterior surface of said spindle and the interior surface of said housing having opposed cylindrical bearing surfaces forming raceways for radial thrust bearings, bearing balls operatively disposed between said raceways, said housing and spindle having opposed annular bearing surfaces forming raceways for axial thrust bearings, bearing balls operatively disposed between said raceways, a head fixedly mounted on said spindle for rotation therewith, said adjustable means including a turntable above said head on which said chuck is mounted and provisions for adjustably supporting said turntable on said head, all of said surfaces and balls being precision made to reduce the inaccuracy of rotation of said spindle to a minimum.

6. In a machine for measuring micro-variations in roundness and concentricity of cylindrical or conical surfaces of a part, an electronic displacement indicator provided with a contact tip adapted to contact the slowly rotating surface of a part to be measured, a polar coordinate chart recorder including a rotary chart disc adapted to have a recording chart positioned thereon and a recorder pen responsive to the signal from the indicator generated by the contact of such tip with such moving surface and adapted to trace a greatly enlarged profile of such surface on said recording chart, a rotary high precision spindle, precision bearings supporting said spindle for rotation about a fixed vertical axis while preventing axial movement of said spindle, means for rotating said spindle about its axis, said disc being synchronized with the rotation of said spindle so that said profile may be directly related to said measured surface, a chuck arranged to hold and support the part to be measured for rotation therewith in fixed relation to said spindle with the axis of said surface oriented parallel to and in fixed relation with said spindle axis, and means supporting said chuck in fixed relation on said spindle for rotation therewith, said means including provisions for two way orientation of said chuck so that said part held by said chuck may be precisely located in a plane perpendicular to the spindle axis and may be tilted into precise alignment with said axis, said machine being characterized in that said indicator and the contact tip thereof are free of the load of the part to be measured, in that said part is supported by said chuck so as to be rotated by said spindle and at the same speed thereof and in that said means rotate said spindle at a slow speed at which said contact tip while in contact with the rotating surface of said part carried by said spindle will accurately sense micro-variations in the surface of such part.

References Cited in the file of this patent

UNITED STATES PATENTS 1,403,156    Gonzalez _____ Jan. 10, 1922

(Other references on following page)

| | | | | | |
|---|---|---|---|---|---|
| 1,488,564 | Steinle | Apr. 1, 1924 | 2,806,294 | Cargill | Sept. 17, 1957 |
| 2,225,273 | Jacobs | Dec. 17, 1940 | 2,825,974 | Algatt | Mar. 11, 1958 |
| 2,331,987 | Leatherman | Oct. 19, 1943 | 2,906,030 | Hofler | Sept. 29, 1959 |
| 2,539,239 | Ernst | Jan. 23, 1951 | | | |
| 2,601,447 | Neff | June 24, 1952 | FOREIGN PATENTS | | |
| 2,660,833 | Weber | Dec. 1, 1953 | 591,197 | Great Britain | Aug. 11, 1947 |
| 2,763,066 | Garrison | Sept. 18, 1956 | 753,788 | Great Britain | Aug. 1, 1956 |